(12) United States Patent
Fukuoka et al.

(10) Patent No.: US 8,229,214 B2
(45) Date of Patent: Jul. 24, 2012

(54) IMAGE PROCESSING APPARATUS AND IMAGE PROCESSING METHOD

(75) Inventors: Shigeo Fukuoka, Kawasaki (JP); Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/545,682

(22) Filed: Aug. 21, 2009

(65) Prior Publication Data

US 2010/0054587 A1 Mar. 4, 2010

(30) Foreign Application Priority Data

Aug. 26, 2008 (JP) ................................ 2008-217322

(51) Int. Cl.
*G06K 9/34* (2006.01)

(52) U.S. Cl. ........ 382/164; 382/167; 382/171; 382/168; 345/619

(58) Field of Classification Search ........................ None
See application file for complete search history.

(56) References Cited

U.S. PATENT DOCUMENTS

| | | | |
|---|---|---|---|
| 5,680,478 A | 10/1997 | Wang | |
| 6,404,921 B1 | 6/2002 | Ishida | |
| 7,692,699 B2 * | 4/2010 | Kobayashi | 348/244 |
| 7,903,307 B2 * | 3/2011 | Dai et al. | 358/1.18 |
| 2005/0238244 A1 | 10/2005 | Uzawa | |
| 2008/0123945 A1 | 5/2008 | Andrew | |
| 2008/0238244 A1 * | 10/2008 | Chaillout et al. | 310/308 |

FOREIGN PATENT DOCUMENTS

| | | |
|---|---|---|
| JP | 2004-350240 A | 12/2004 |
| WO | 2006066325 A1 | 6/2006 |

* cited by examiner

*Primary Examiner* — Jason M Repko
*Assistant Examiner* — David Perlman
(74) *Attorney, Agent, or Firm* — Canon USA, Inc., IP Division

(57) ABSTRACT

An image processing apparatus includes an attribute information generation unit configured to generate attribute information about each pixel of input image data, a division unit configured to divide the input image data into a plurality of blocks of a predetermined size, a generation unit configured to generate a histogram of a color and a pixel existing in a focused block divided by the division unit, a color replacement unit configured to execute color replacement processing on each area defined by the histogram generated by the generation unit, a gradation presence determination unit configured to determine whether gradation exists, and a block integration unit configured, if it is determined that gradation exists, to integrate a focused area and an adjacent area to generate continuous gradation in the focused area and the adjacent area.

4 Claims, 17 Drawing Sheets

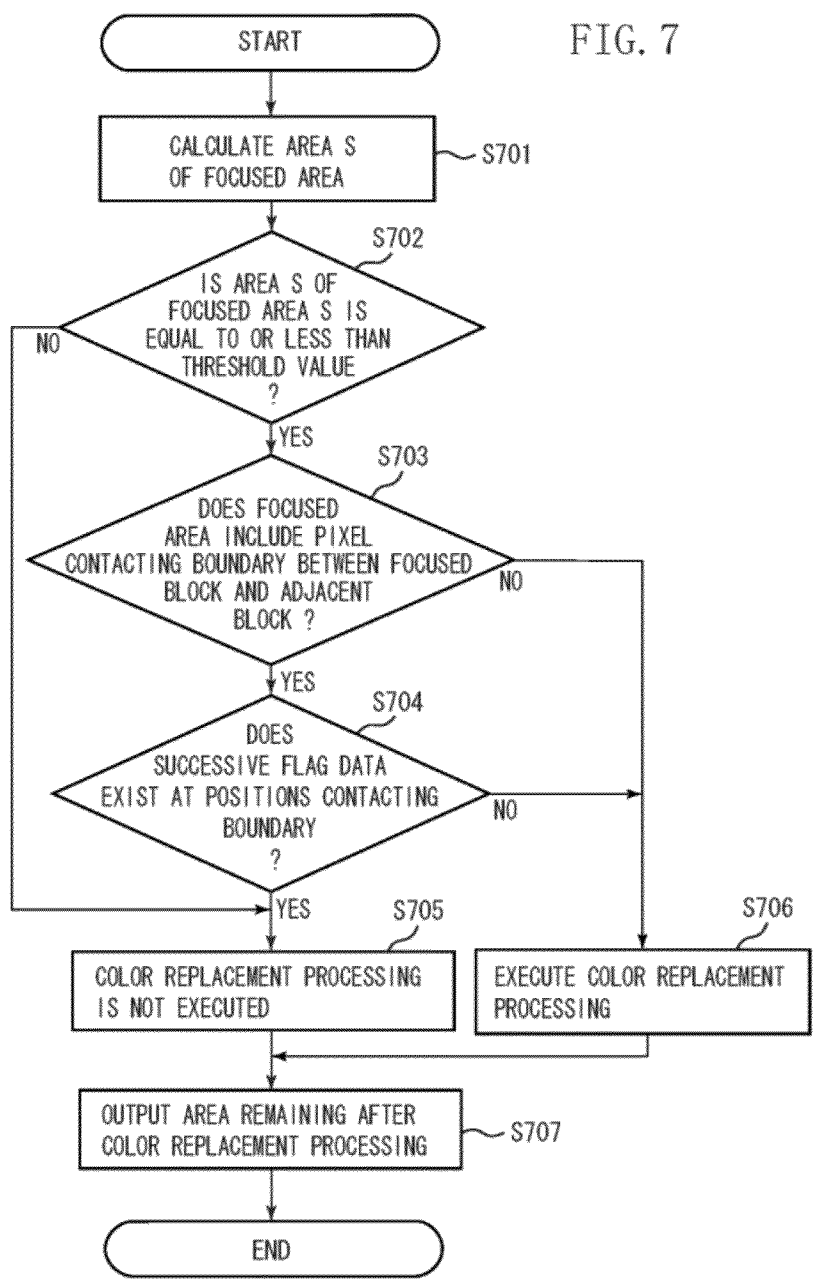

FIG. 14

| | |
|---|---|
| 0 | 0 |
| 0 | 1 |
| 1 | 0 |
| 1 | 0 |
| 0 | 0 |
| 0 | 0 |
| 0 | 0 |
| 0 | 0 |
| 0 | 0 |
| 0 | 0 |
| 0 | 0 |
| 0 | 1 |
| 0 | 1 |
| 0 | 1 |
| 1 | 0 |
| 0 | 0 |

FIG. 15
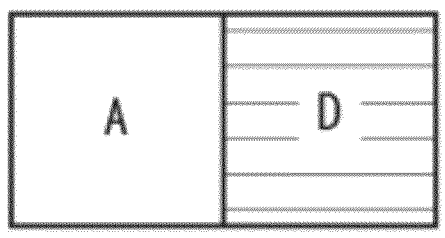 TWO COMBINATIONS
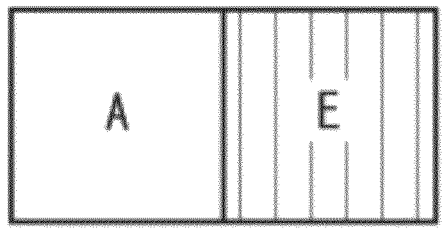 TWO COMBINATIONS
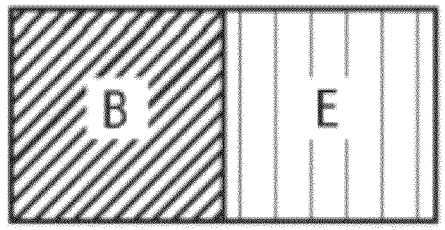 SEVEN COMBINATIONS
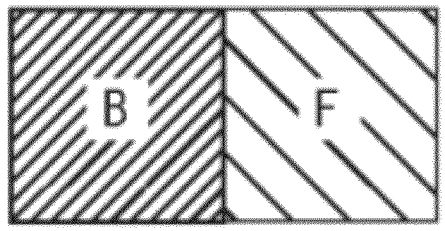 THREE COMBINATIONS
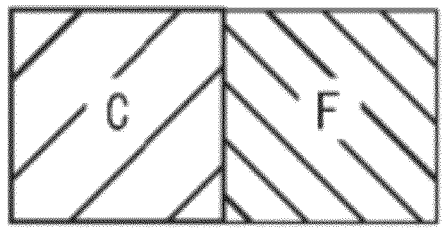 TWO COMBINATIONS

IMAGE PROCESSING APPARATUS AND IMAGE PROCESSING METHOD

BACKGROUND OF THE INVENTION

1. Field of the Invention

The present invention relates to an image processing apparatus and method for extracting each element, such as a character (text) or a photograph, from image data.

2. Description of the Related Art

As a technique for extracting an element of image data, such as a text or a photograph, from image data, International Publication WO 2006/066325 discusses a method for dividing an input image into a plurality of blocks and executing color replacement on each block.

In the divided image, the brightness and the color tone may gradually change over a plurality of blocks (i.e., gradation may exist over a plurality of blocks).

In the method discussed in International Publication WO 2006/066325, because this method executes color replacement processing on each divided block, the color of image data may sharply change if a continuous gradation exists across a boundary between blocks.

SUMMARY OF THE INVENTION

According to an aspect of the present invention, an image processing apparatus includes an input unit configured to input image data, an attribute information generation unit configured to generate attribute information about each pixel of the image data input by the input unit, a division unit configured to divide the image data input by the input unit into a plurality of blocks of a predetermined size, a generation unit configured to generate a histogram of colors and the number of pixels of each color existing in a focused block (target block) divided by the division unit, a color replacement unit configured to execute color replacement processing on each area defined by the histogram generated by the generation unit, a calculation unit configured to calculate, according to a result of the color replacement processing by the color replacement unit, a chrominance difference between a focused pixel (target pixel) contacting a boundary between the focused block and an adjacent block, which exists at a location adjacent to the focused block within a focused area (target area) of the focused block, and an adjacent pixel contacting the boundary within an adjacent area of the adjacent block located adjacent to the focused area, the adjacent pixel being located adjacent to the focused pixel, a first determination unit configured to determine whether the chrominance difference calculated by the calculation unit falls within a predetermined range, a second determination unit configured to determine whether a ratio Y/X is equal to or less than a predetermined threshold value, where "X" denotes a number of combinations of the focused pixel and the adjacent pixel whose chrominance difference is determined by the first determination unit to fall within the predetermined range and "Y" denotes a number of combinations of the focused pixel and the adjacent pixel, to at least either one of which the attribute information is added, and an integration unit configured, if it is determined by the second determination unit that the ratio Y/X is equal to or less than the threshold value, to integrate the focused area and the adjacent area to generate continuous gradation in the focused area and the adjacent area based on a determination that gradation across the boundary exists.

According to another aspect of the present invention, an image processing method includes inputting image data, generating attribute information about each pixel of the input image data, dividing the input image data into a plurality of blocks of a predetermined size, generating a histogram of colors and the number of pixels of each color existing in a divided focused block, executing color replacement processing on each area defined by the generated histogram, calculating, according to a result of the color replacement processing, a chrominance difference between a focused pixel contacting a boundary between the focused block and an adjacent block, which exists at a location adjacent to the focused block within a focused area of the focused block, and an adjacent pixel contacting the boundary within an adjacent area of the adjacent block located adjacent to the focused area, which adjacent pixel being located adjacent to the focused pixel, determining whether the calculated chrominance difference falls within a predetermined range, determining whether a ratio Y/X is equal to or less than a predetermined threshold value, where "X" denotes a number of combinations of the focused pixel and the adjacent pixel whose chrominance difference is determined to fall within the predetermined range and "Y" denotes a number of combinations of the focused pixel and the adjacent pixel, to at least either one of which the attribute information is added, and integrating, if it is determined that the ratio Y/X is equal to or less than the threshold value, the focused area and the adjacent area to generate continuous gradation in the focused area and the adjacent area based on a determination that gradation across the boundary exists.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 7 is a flow chart illustrating an example of processing executed by a color replacement unit 213 according to an exemplary embodiment of the present invention.

FIG. 14 illustrates an example of a boundary of each pixel-attribute information generated by a pixel-attribute information generation unit 203 according to an exemplary embodiment of the present invention.

FIG. 15 illustrates an example of the combination of colors and the number of combinations of each pixel existing on the boundary between blocks illustrated in FIG. 13 according to an exemplary embodiment of the present invention.

DESCRIPTION OF THE EMBODIMENTS

Figure 1:
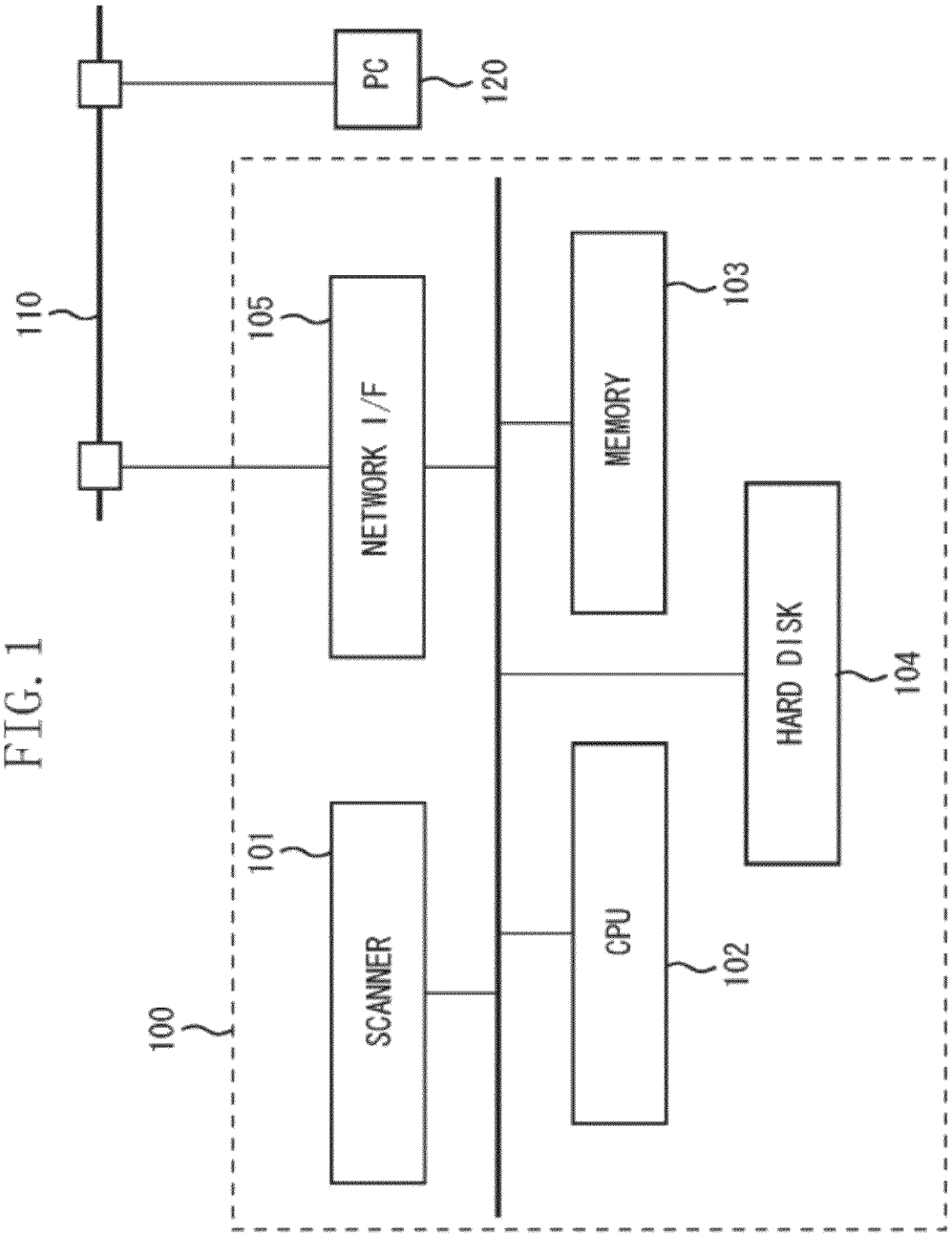
FIG. 1 is a block diagram illustrating an exemplary functional configuration of an image processing system according to a first exemplary embodiment of the present invention.

Now, a first exemplary embodiment of the present invention will be described in detail below. FIG. 1 illustrates an exemplary functional configuration of an image processing system according to a first exemplary embodiment of the present invention.

Referring to FIG. 1, an image processing apparatus 100 includes a scanner 101, a central processing unit (CPU) 102, a memory 103, a hard disk 104, and a network interface (I/F) 105. The scanner 101 converts information about a scanned document sheet into image data. The CPU 102 executes a program for executing processing according to the present invention on image data. The memory 103 functions as a work memory and a temporary data storage area when executing a program. The hard disk 104 stores a program and data. The network interface (I/F) 105 is used for executing data communication with an external apparatus.

A personal computer (PC) 120 is connected with the image processing apparatus 100 via a network, such as a local area network (LAN) 110. The PC 120 receives data transmitted from the image processing apparatus.

Figure 2:
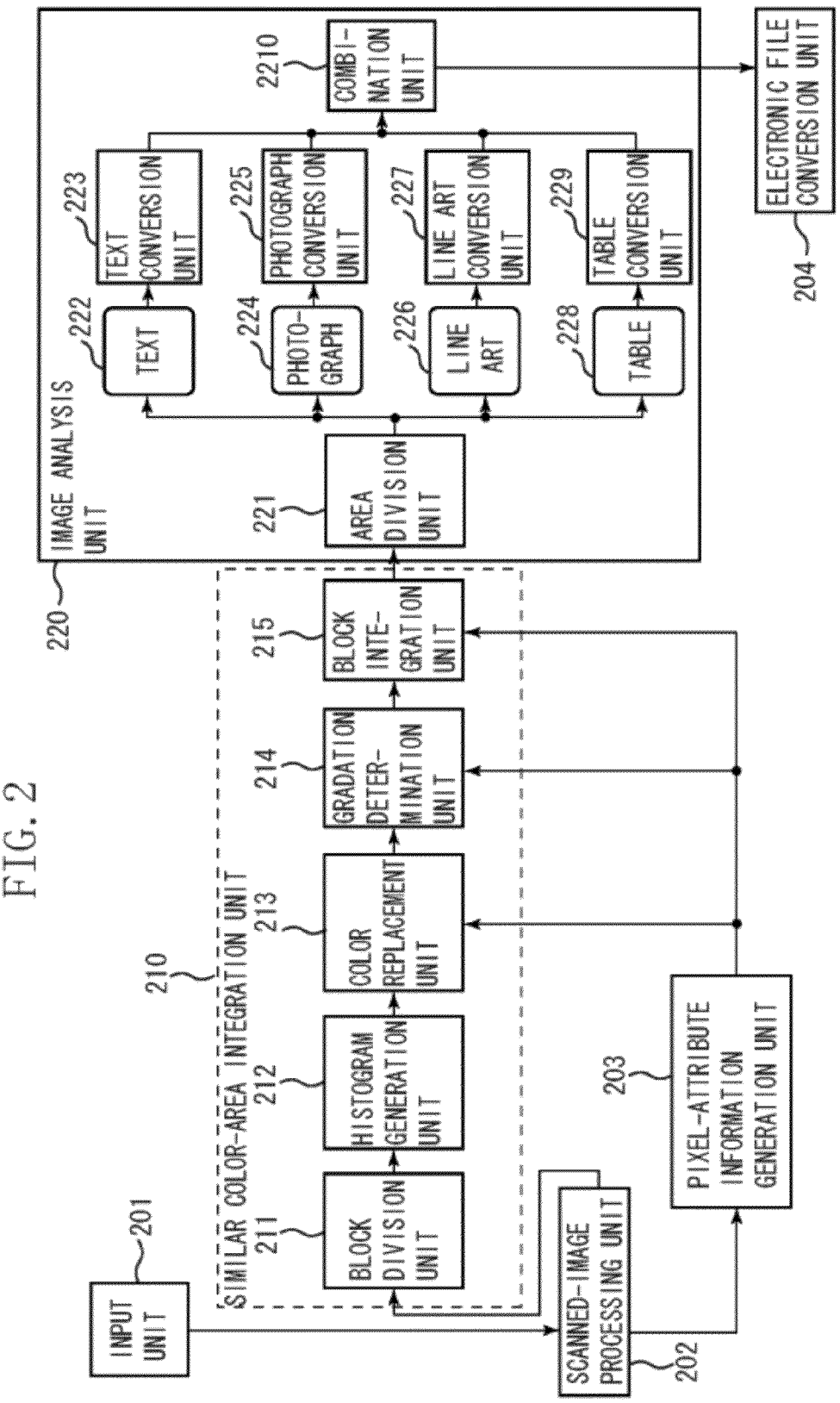
FIG. 2 is a block diagram illustrating an exemplary functional configuration of an image processing apparatus 100 according to the first exemplary embodiment of the present invention.

FIG. 2 illustrates an exemplary functional configuration of the image processing apparatus 100 according to the present exemplary embodiment. In the present exemplary embodiment, each processing illustrated in FIG. 2 is implemented by the CPU 102 by executing an electronic document generation program. However, the present exemplary embodiment is not limited to this. More specifically, it is also useful if a part of or the entire processing is constituted by an electronic circuit.

Referring to FIG. 2, an input unit 201 inputs a document using the scanner 101. A scanned-image processing unit 202 digitizes (converts the scanned document image into image data) the document to generate image data. A pixel-attribute information generation unit 203 generates attribute data of each pixel.

"Each pixel-attribute information (data)" refers to a signal that indicates an image area attribute of each pixel (hereinafter simply referred to as "flag data"), which is acquired by extracting a characteristic of a document image in order to execute optimum image processing according to a characteristic of an image included in a document image. More specifically, a document image read by an image scanner may include various image areas, such as a full color photograph area having a continuous gradation, a text area including a single color of black, or a halftone dot print area as in newspaper printing.

If an image having various image areas is output by equally executing the same image processing thereon, then the quality of a resulting output image may be low. Accordingly, the present exemplary embodiment detects an attribute of image data included in an original image using color image data input by the input unit 201 and generates flag data. "Flag data" is used for identifying the attribute of image data.

A method discussed in Japanese Patent Application Laid-Open No. 2004-350240 can be used for executing the above-described processing. More specifically, the following processing is executed for a text attribute. Image data is serially focused on in order of rasterization scanning. Then, pixels existing in a specific range (e.g., 7×7 pixel area) from a target pixel (i.e. a focused pixel) is subjected to filtering using the Laplacian filtering method. If the value of the focused pixel is greater than a predetermined threshold value, then it is determined that the pixel constitutes an edge.

In detecting a character (text), because a text is mainly constituted by a line, a text area can be efficiently detected by using a filter for a relatively low frequency in a specific direction.

If a predetermined or greater number of pixels that have been determined to be edges of a character are included in a specific area in the vicinity of a focused pixel, then a corresponding text flag is set for the focused pixel as a pixel existing in a text area. As a matter of course, various attribute data, such as a halftone dot attribute or a graphic attribute, is generated in addition to the text attribute by the image processing.

In addition to using attribute data acquired by using an image scanner, it is also useful to refer to information indicating the type of a page description language (PDL) command when generating a print image by interpreting a PDL command from PDL data. In this case, flag data for identifying a pixel constituting a text area is detected for each pixel.

Regardless of which of the above-described attribute data and the PDL command type information is used, the data or the information is a signal that outputs 1-byte data including a value "1", which indicates that the attribute of a pixel is the text attribute, or a value "0", which indicates that the attribute of the pixel is an attribute other than the text attribute.

Figure 3A:
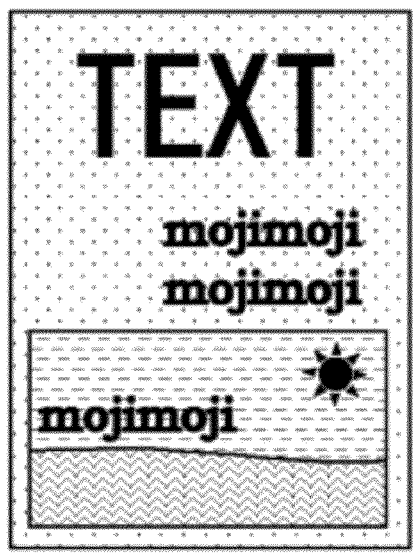
FIG. 3A illustrates an example of input image data and FIG. 3B illustrates an example of attribute data generated based on the input image data according to an exemplary embodiment of the present invention.
Figure 3B:
Figure 4B:
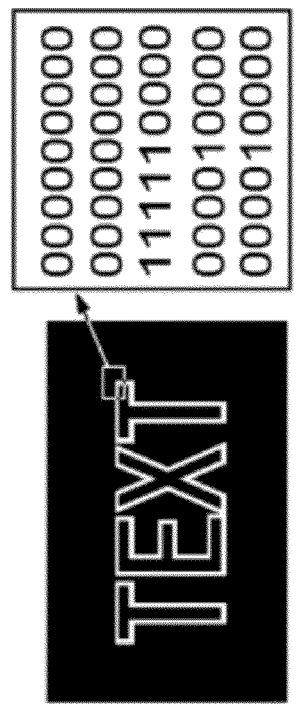
FIG. 4B illustrates an exemplary modification of the flag data illustrated in FIG. 4A according to an exemplary embodiment of the present invention.
Figure 4A:
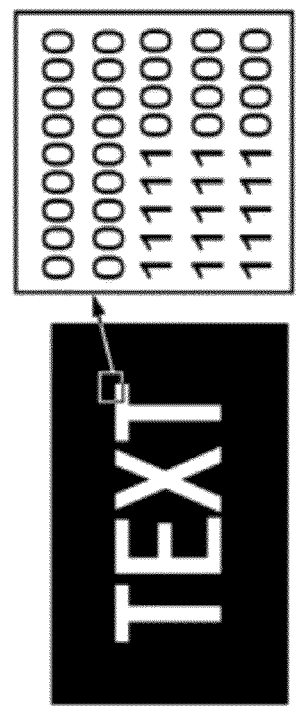
FIG. 4A illustrates the attribute data generated as illustrated in FIG. 3B as flag data.

FIG. 3A illustrates an example of input image data. FIG. 3B illustrates an example of attribute data generated based on the input image data illustrated in FIG. 3A. FIG. 4A illustrates the attribute data generated as illustrated in FIG. 3B in the form of flag data. FIG. 4B illustrates an example of a modification of the flag data illustrated in FIG. 4A.

If, for example, the image data illustrated in FIG. 3A is input, attribute data for each pixel illustrated in FIG. 3B is generated as well as the image data. The attribute data generated in the above-described manner is information whose black portion indicates a value "0" while whose white portion indicates a value "1" as illustrated in FIG. 4A.

In the present exemplary embodiment, each pixel-attribute data is information indicating the entire text area. However, the present invention is not limited to this. More specifically, it is also useful if each pixel-attribute data is information indicating an edge of a text only.

Referring to FIG. 2, a similar color-area integration unit 210 executes color replacement processing on a color image and divides the color-replaced color image into similar color-areas. Scan noise and mosquito noise may be additionally included in an input image. In this case, the tint of areas of the input image, whose colors have been the same, may become slightly different depending on areas. Accordingly, the similar color-area integration unit 210 acquires statistics of color information of the areas and executes color replacement of similar colors.

The similar color-area integration unit 210 includes a block division unit 211, a histogram generation unit 212, a color replacement unit 213, a gradation determination unit 214, and a block integration unit 215.

The block division unit 211 divides the image data input via the input unit 201 into a plurality of blocks of a predetermined size. The histogram generation unit 212 generates a histogram of the colors and the number of pixels existing within the focused block (target block) divided by the block division unit 211. The histogram indicates a relation between the colors and the number of pixels of each color in a focused block.

The color replacement unit 213 executes color replacement processing for each area determined according to the histogram generated by the histogram generation unit 212. Furthermore, the color replacement unit 213 replaces the color of a pixel in the area having a focused color with a different other color according to a predetermined condition, which will be described in detail later below, in order to integrate the area having the focused color and an area of a different other color, which contacts the focused color area. The gradation determination unit 214 will be described in detail below.

If a predetermined condition, which will be described in detail below, is satisfied, the block integration unit 215 integrates the focused area and the area existing in a block that is in contact with the focused area.

Figure 5A:
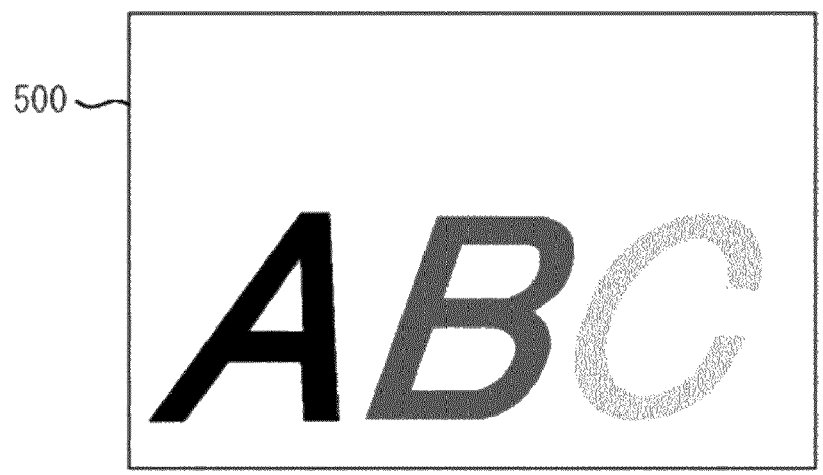
FIG. 5A illustrates an example of an image 500 input to a similar color-area integration unit 210.
Figure 5B:
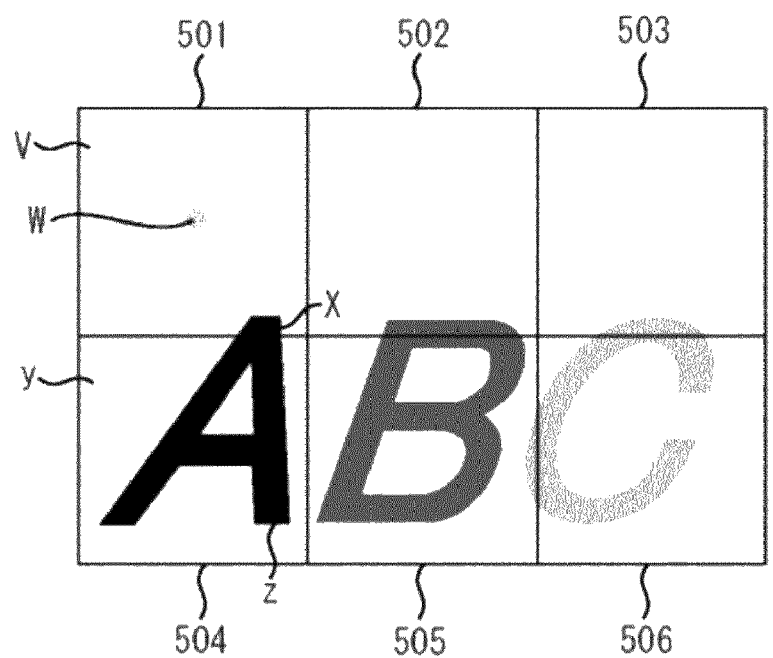
FIG. 5B illustrates an example of a state in which the image 500 is divided by a block division unit 211 according to an exemplary embodiment of the present invention.
Figure 6A:
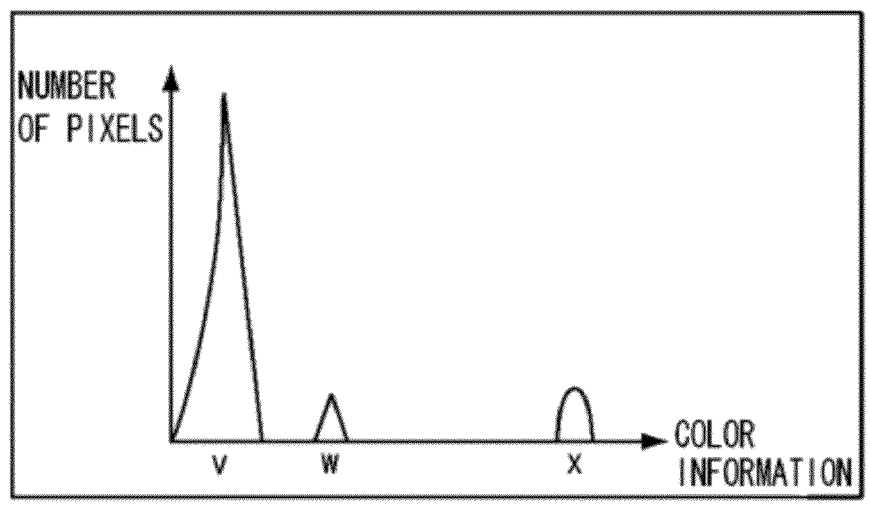
FIG. 6A schematically illustrates an exemplary distribution of color information about a block 501 illustrated in FIG. 5B, and FIG. 6B schematically illustrates an exemplary distribution of color information about a block 504 illustrated in FIG. 5B according to an exemplary embodiment of the present invention.
Figure 6B:
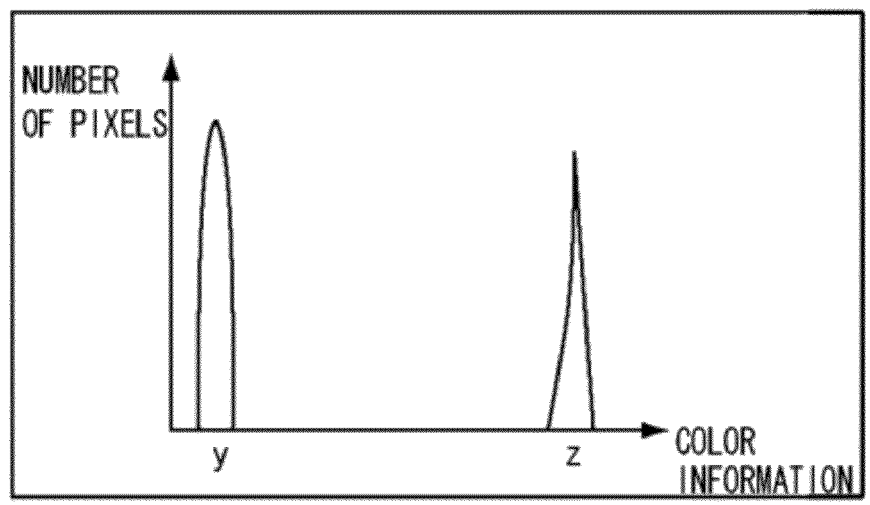

FIG. 5A illustrates an example of an image 500, which is input to the similar color-area integration unit 210. FIG. 5B illustrates an example of a state of the image 500 divided by the block division unit 211. FIG. 6A schematically illustrates an example of a distribution of color information about the block 501, which is illustrated in FIG. 5B. FIG. 6B schematically illustrates an example of the distribution of color information about a block 504, which is illustrated in FIG. 5B.

In the present exemplary embodiment, as illustrated in FIG. 5B, longitudinal and lateral sizes of a block are constant. More specifically, the block division unit 211 divides a block into six blocks 501 through 506. Furthermore, the histogram generation unit 212 extracts color information of each block by using a publicly known method. In the present exemplary embodiment, the histogram generation unit 212 extracts color information and the statistical distribution thereof.

The color replacement unit 213 performs the color replacement of the pixel in a block according to the color information acquired in the above-described manner. Now, an operation of the color replacement unit 213 will be described in detail below with reference to FIG. 7.

Figure 8C:
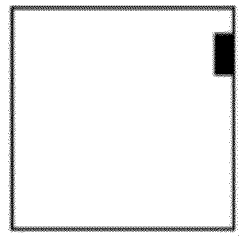
FIG. 8C illustrates an example of a pixel area 800 after color replacement.
Figure 8B:
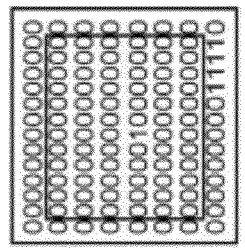
FIG. 8B illustrates an example of flag data of the block 501.
Figure 8A:
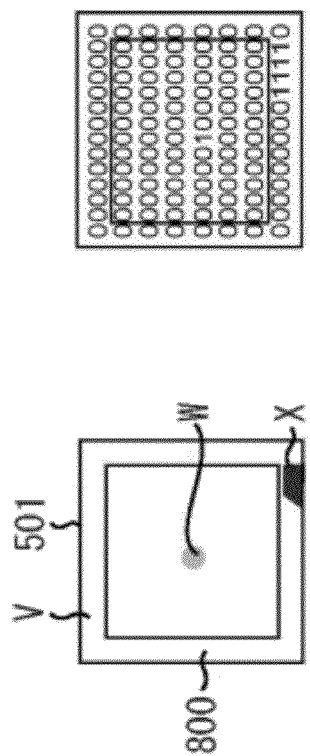
FIG. 8A illustrates an example of the block 501.
Figure 8D:
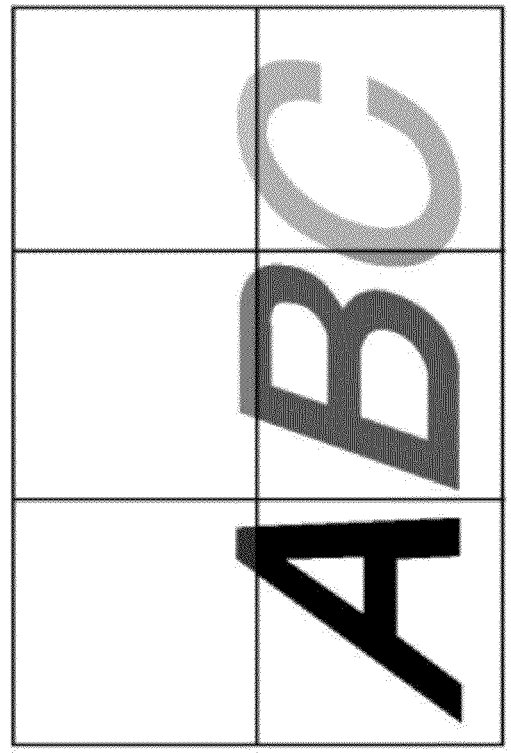
FIG. 8D illustrates an example of the image 500 after the color replacement according to an exemplary embodiment of the present invention.

FIGS. 7A through 7C each illustrate an example of the operation of the color replacement unit 213 according to the present exemplary embodiment. FIG. 8A illustrates an example of the block 501. FIG. 8B illustrates an example of the flag data of the block 501. FIG. 8C illustrates an example of a pixel area 800 after color replacement. FIG. 8D illustrates an example of the image 500 after color replacement.

Referring to FIG. 7, in step S701, the color replacement unit 213 calculates the area S of a focused area having a focused color determined according to a histogram generated by the histogram generation unit 212. More specifically, the color replacement unit 213 calculates the number of pixels by grouping areas having similar color information according to the above-described color information distribution.

In step S702, the color replacement unit 213 determines whether the area of the focused area S is equal to or less than a previously set threshold value (S≦th1). If it is determined that the area of the focused area is greater than the threshold value Th1 in step S702 (NO in step S702), then, the processing advances to step S705. In step S705, the color replacement unit 213 determines the area having the focused color as a significant area. Then, the color replacement unit 213 does not execute the color replacement processing and determines the area as an independent area.

In the case of the block 501 as illustrated in FIG. 5, the area S of an area v is greater than the threshold value Th1 (NO in step S702). Accordingly, the processing advances to step S705. On the other hand, the area of each of areas w and x is equal to or less than the threshold value Th1 (YES in step S702). Accordingly, the processing advances to step S703. Furthermore, in the case of the block 504, the area of each of areas y and z is greater than the threshold value Th1 (NO in step S702). Accordingly, the processing advances to step S705.

Generally, a conventional method determines an area with a small size as noise and replaces the color of the small area with the color of a different other area. However, even if the size of an area is small within a block, the area may not always be noise if the area is divided by a boundary between blocks. Accordingly, the present exemplary embodiment executes the processing in step S703 and subsequent processing.

In step S703, the color replacement unit 213 determines whether the focused area includes a pixel contacting the boundary between the focused block and adjacent blocks. In spite of that, it is also useful if the color replacement unit 213 determines whether the focused area includes a pixel existing from the boundary within a distance equivalent to pixels of a predetermined specific range.

If it is determined that the focused area includes a pixel contacting the boundary between the focused block and an adjacent block (YES in step S703), then the processing advances to step S704. On the other hand, if it is determined that the focused area does not include a pixel contacting the boundary between the focused block and an adjacent block (NO in step S703), then the processing advances to step S706.

In the present exemplary embodiment, the pixel area 800 illustrated in FIG. 8A is a pixel area that is determined to be an edge of the focused block 501. The area w, among the areas w and x of the block 501 is not included in the pixel area 800 (NO in step S703). Accordingly, the processing advances to step S706. With respect to the area x, which is included in the pixel area 800 (YES in step S703), the processing advances to step S704.

In step S704, the color replacement unit 213 refers to the flag data generated by the pixel-attribute information generation unit 203 and determines whether successive flag data exist in an area that is in contact with the boundary. If it is determined that successive flag data exist in an area that is in contact with the boundary (YES in step S704), then the processing advances to step S705.

On the other hand, if it is determined that successive flag data does not exist in an area that is in contact with the boundary (NO in step S704), then the processing advances to step S706. In the processing in step S704, it is determined whether "successive" flag data exists in addition to determining whether flag data exists. Thus, the present exemplary embodiment can prevent erroneously recognizing the area as noise.

In the example illustrated in FIG. 8B, the successive flags having a value "1" exist in the position corresponding to the area x of the block 501. Accordingly, the processing advances to step S705. In step S705, the color replacement unit 213 processes the area as an independent area.

After color replacing the pixel area 800 in the above-described manner, the state of the pixel area 800 becomes the example illustrated in FIG. 8C. The area w, which has been recognized as scan noise, is replaced with a color of an adjacent area. The area x, which was a large area before the division and has been divided into a small area by the block division, remains as it is as an independent area. Accordingly, the area x is not subjected to color replacement processing.

In step S707, the color replacement unit 213 outputs the area remaining after the color replacement processing. As a result, the state of the image 500 becomes as illustrated in FIG. 8D.

Exemplary Configuration and Operation of the Gradation Determination Unit 214

The gradation determination unit 214 determines whether the block includes gradation according to information about color-replaced block by block by the color replacement unit 213 and each pixel-attribute information generated by the pixel-attribute information generation unit 203. Furthermore, the gradation determination unit 214 adds information indicating whether the block includes gradation to the color information that has been subjected to the color replacement processing block by block.

More specifically, the gradation determination unit 214 includes a calculation unit, a first determination unit, and a second determination unit. The calculation unit calculates a chrominance difference between pixels. The first determination unit determines whether the chrominance difference calculated by the calculation unit is equal to or less than a predetermined threshold value. The second determination unit determines whether a value of an edge ratio, which will be described in detail below, falls within the predetermined range.

The calculation unit calculates the chrominance difference between a focused pixel existing in contact with the boundary between the focused block and an adjacent block within the focused area of the focused block and an adjacent pixel existing in contact with the boundary within the adjacent area of the adjacent block and existing in contact with the focused pixel according to a result of the color replacement by the color replacement unit 213.

The edge ratio, which is used by the second determination unit, can be calculated by an expression "Y/X", where "X" denotes the number of combinations of a focused pixel and an adjacent pixel whose chrominance difference has been determined to fall within a predetermined range and "Y" denotes the number of combinations of a focused pixel and an adjacent pixel, to at least either one of which attribute information has been added.

In the present exemplary embodiment, a block existing adjacent to a focused block is referred to as an "adjacent block". Furthermore, in the present exemplary embodiment, an area of an adjacent block is referred to as an "adjacent area" and a pixel in an adjacent area is referred to as an "adjacent pixel".

Figure 9:
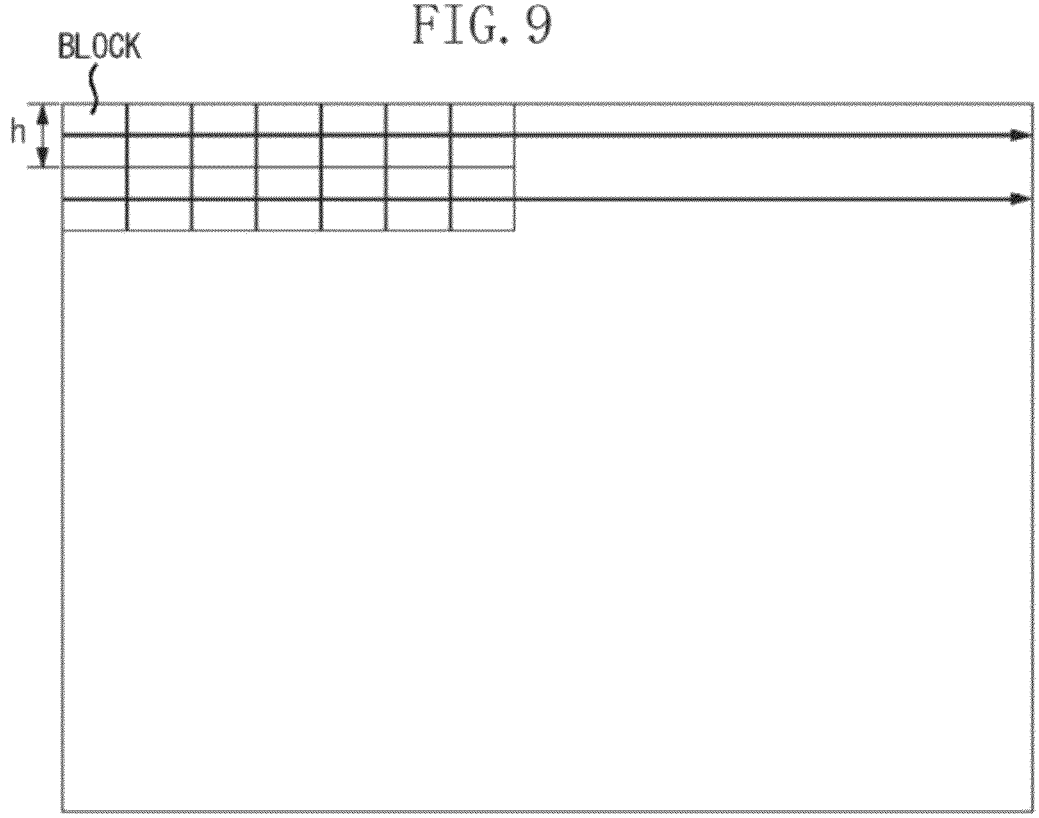
FIG. 9 illustrates an example of processing executed by a gradation determination unit 214 according to an exemplary embodiment of the present invention.
Figure 10:
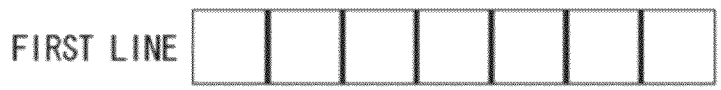
FIG. 10 illustrates an example of processing executed by the gradation determination unit 214 according to an exemplary embodiment of the present invention.
Figure 11:
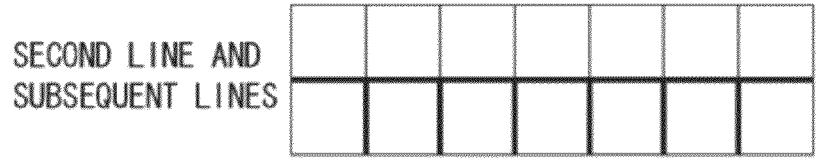
FIG. 11 illustrates an example of processing executed by the gradation determination unit 214 according to an exemplary embodiment of the present invention.

FIGS. 9 through 11 each illustrate an example of processing executed by the gradation determination unit 214. The gradation determination unit 214 includes a sensor whose height is equivalent to a block height h illustrated in FIG. 9. The gradation determination unit 214 processes blocks corresponding to one scanning line at once by scanning the image from the left to the right portion thereof with the sensor.

In the present exemplary embodiment, the gradation determination unit 214 executes the processing on the blocks from the left to right only and the sensor moves leftwards only to come back to the scanning start position. However, the present exemplary embodiment is not limited to this. More specifically, it is also useful if the gradation determination unit 214 scans the blocks in both leftward and rightward directions.

In processing a first line, since no previous line exists as illustrated in FIG. 10, the gradation determination unit 214 executes processing for the boundary between blocks in the same line. In processing an n-th line (n is an integer of 2 or greater), the gradation determination unit 214 executes processing for the boundary between an n-th line-block and (n−1)-th line-block and the boundary among n-th line blocks. More specifically, in this case, the processing for the boundaries illustrated in FIG. 11 with the thick solid lines is processed. When the entire image is completely processed in the above-described manner, the gradation determination unit 214 ends the processing.

Figure 12:
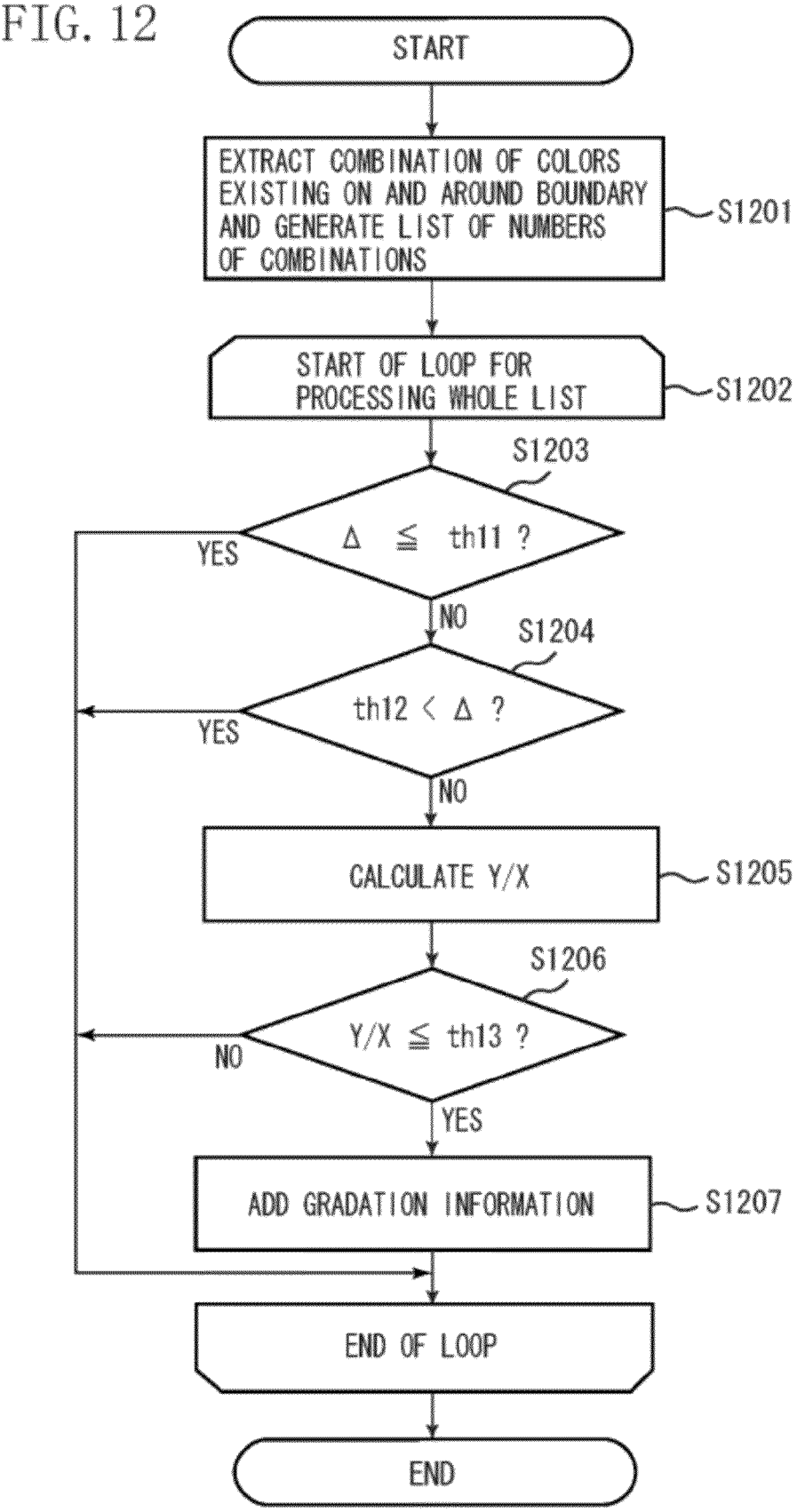
FIG. 12 is a flow chart illustrating an example of processing executed by the gradation determination unit 214 according to an exemplary embodiment of the present invention.
Figure 13:
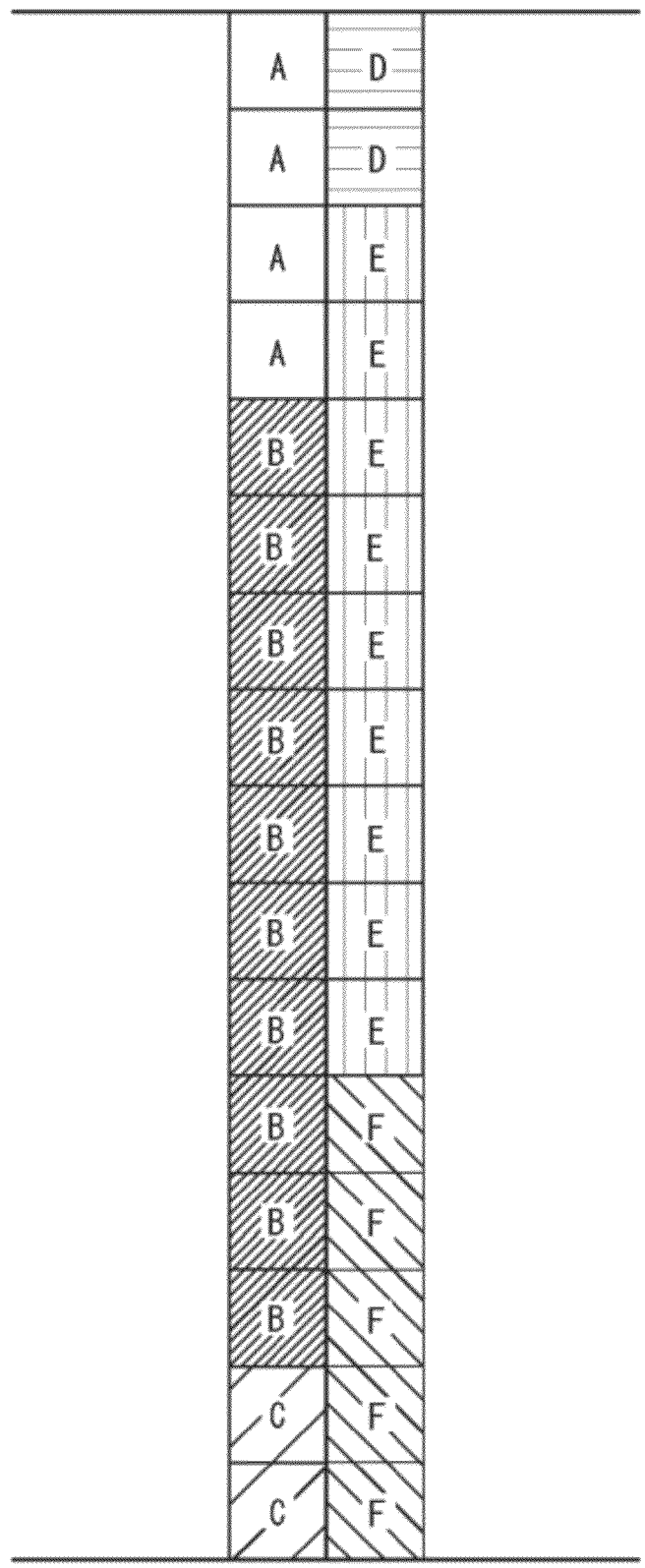
FIG. 13 schematically illustrates an example of a boundary between blocks after the processing by the color replacement unit 213 according to an exemplary embodiment of the present invention.
Figure 14:
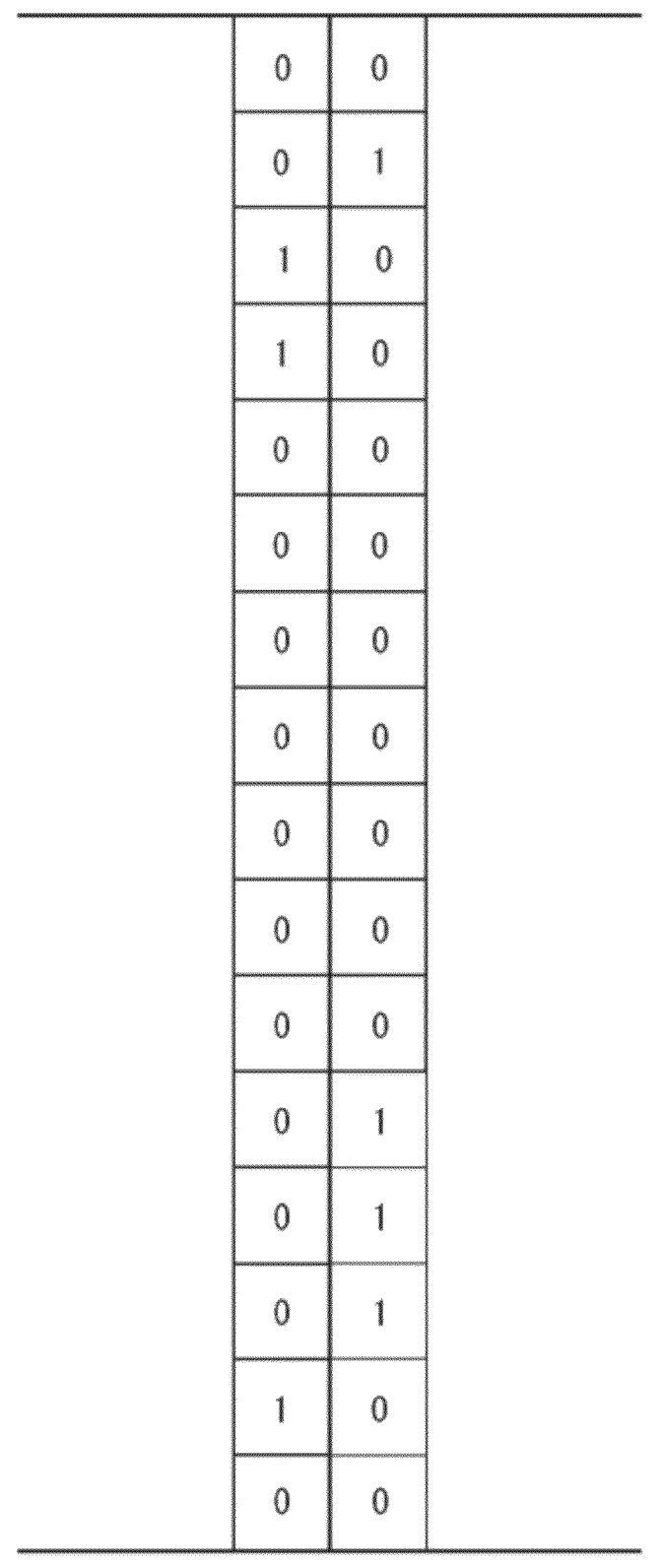

FIG. 12 illustrates exemplary processing executed by the gradation determination unit 214. FIG. 13 schematically illustrates an example of a boundary between blocks after processing by the color replacement unit 213. FIG. 14 illustrates an example of a boundary between the each pixel-attribute information generated by the pixel-attribute information generation unit 203. FIG. 15 illustrates an example of the combination of colors and the number of combinations of pixels existing on the boundary between blocks illustrated in FIG. 13.

Referring to FIG. 12, in step S1201, the gradation determination unit 214 extracts the combination of colors and the number of the combinations of pixels existing adjacent to one another and contacting the boundary between the focused block and adjacent blocks existing adjacent to the focused block.

More specifically, if the combination of colors is as illustrated in FIG. 13, the combination of colors and the number of combinations illustrated in FIG. 15 are extracted. The gradation determination unit 214 executes the above-described processing on each line.

In step S1202, the gradation determination unit 214 issues a command for starting loop processing in step S1203 and subsequent steps. The processing is performed on the combination of colors of the boundary portion, after color replacement, obtained in step S1201. In step S1203, the gradation determination unit 214 determines whether a chrominance difference Δ of the focused combination extracted in step S1201 is equal to or less than a threshold value th11.

If it is determined that the chrominance difference Δ is equal to or less than a threshold value th11 (YES in step S1203), the gradation determination unit 214 determines that the combination has the same color (that gradation is not included). Accordingly, the gradation determination unit 214 ends the series of loop processing and executes the above-described determination on a subsequent combination.

On the other hand, if it is determined that the chrominance difference Δ is greater than the threshold value th11 (NO in step S1203), then the processing advances to step S1204.

In step S1204, the gradation determination unit 214 determines whether the chrominance difference Δ of the focused combination extracted in step S1201 is greater than a threshold value th12. If it is determined that the chrominance difference Δ of the focused combination extracted in step S1201 is greater than a threshold value th12 (YES in step S1204), then the gradation determination unit 214 determines that the focused combination has different colors (that no gradation is included in the combination). Accordingly, in this case, the gradation determination unit 214 ends the series of the loop processing and executes determination on a subsequent color.

On the other hand, if it is determined that the chrominance difference Δ of the focused combination extracted in step S1201 is equal to or less than a threshold value th12 (NO in step S1204), then the processing advances to step S1205.

The gradation determination unit 214 executes the processing in step S1205 if the above-described condition (i.e., an expression "threshold value th11≦chrominance difference Δ<threshold value th12") is satisfied.

More specifically, if the chrominance difference Δ is equal to or less than the threshold value th11, it is determined that the focused combination includes areas that have belonged to the same area before the division (e.g., the areas x and z illustrated in FIG. 5B). Accordingly, in this case, the gradation determination unit 214 determines that no gradation is included in the combination. On the other hand, if the chrominance difference Δ is greater than the threshold value th12, it is determined that areas that have not belonged to the same area are normally divided into small areas. Accordingly, in this case, the gradation determination unit 214 determines that no gradation is included in the combination.

In step S1205, the gradation determination unit 214 calculates a ratio by an expression "Y/X", where "Y" denotes the number of all combinations whose chrominance difference Δ has been determined in step S1203 to be equal to or less than the threshold value th11 and "X" denotes the number of combinations including an edge flag among the combinations of colors extracted in step S1201.

In the present exemplary embodiment, it is supposed that the combinations illustrated in FIG. 15 satisfy the following conditions.

$$\Delta A-D \leq th11$$

$$th11 < \Delta A-E \leq th12$$

$$th11 < \Delta B-E \leq th12$$

$$th12 < \Delta C-E$$

$$th12 < \Delta C-F$$

In this case, the combination including A and D is determined to have the same color in step S1203 while the combinations of C and E, and C and F is respectively determined to include different colors in step S1204. Accordingly, the combinations of A and E, and B and E are to be processed in step S1205.

In the example illustrated in FIG. 15, the combination of A and E includes two pixels in which a value "1" is set for the edge flag. Accordingly, in step S1205, the gradation determination unit 214 acquires an edge ratio of "1.0" (=2/2). With respect to the combination of B and E, no pixel whose value for the edge flag is "1" is included. Accordingly, in step S1205, the gradation determination unit 214 acquires an edge ratio of "0" (=0/7).

In step S1206, the gradation determination unit 214 determines whether the edge ratio is equal to or less than a threshold value th13. If it is determined that the edge ratio is equal to or less than a threshold value th13 (YES in step S1206), then the gradation determination unit 214 determines that gradation is included in the combination. Then, the processing advances to step S1207.

On the other hand, if it is determined that the edge ratio is greater than a threshold value th13 (NO in step S1206), then the gradation determination unit 214 determines that no gradation is included in the combination. Then, the gradation determination unit 214 executes determination on a subsequent color.

If the threshold value th13 is set at a value "0.2", then th13<Y/X (=1.0). Accordingly, the gradation determination unit 214 determines that the combination of A and E does not include gradation. On the other hand, because Y/X (=0)<th13, the gradation determination unit 214 determines that the combination of B and E includes gradation.

In step S1207, the gradation determination unit 214 adds information indicating the presence of gradation to the combination of colors that has been determined in step S1206 to include gradation. The information indicating the presence of gradation is hereinafter referred to as "gradation information". In the present exemplary embodiment, the gradation determination unit 214 determines that the combination of B and E includes gradation. Accordingly, the gradation determination unit 214 adds gradation information to two areas of the combination existing adjacent to each other across the boundary.

In the above-described manner, the present exemplary embodiment can process one boundary between blocks. After executing the above-described processing for the other boundary between the block and other blocks, the present exemplary embodiment ends the processing for one block.

Operation of the Block Integration Unit 215

Figure 16:
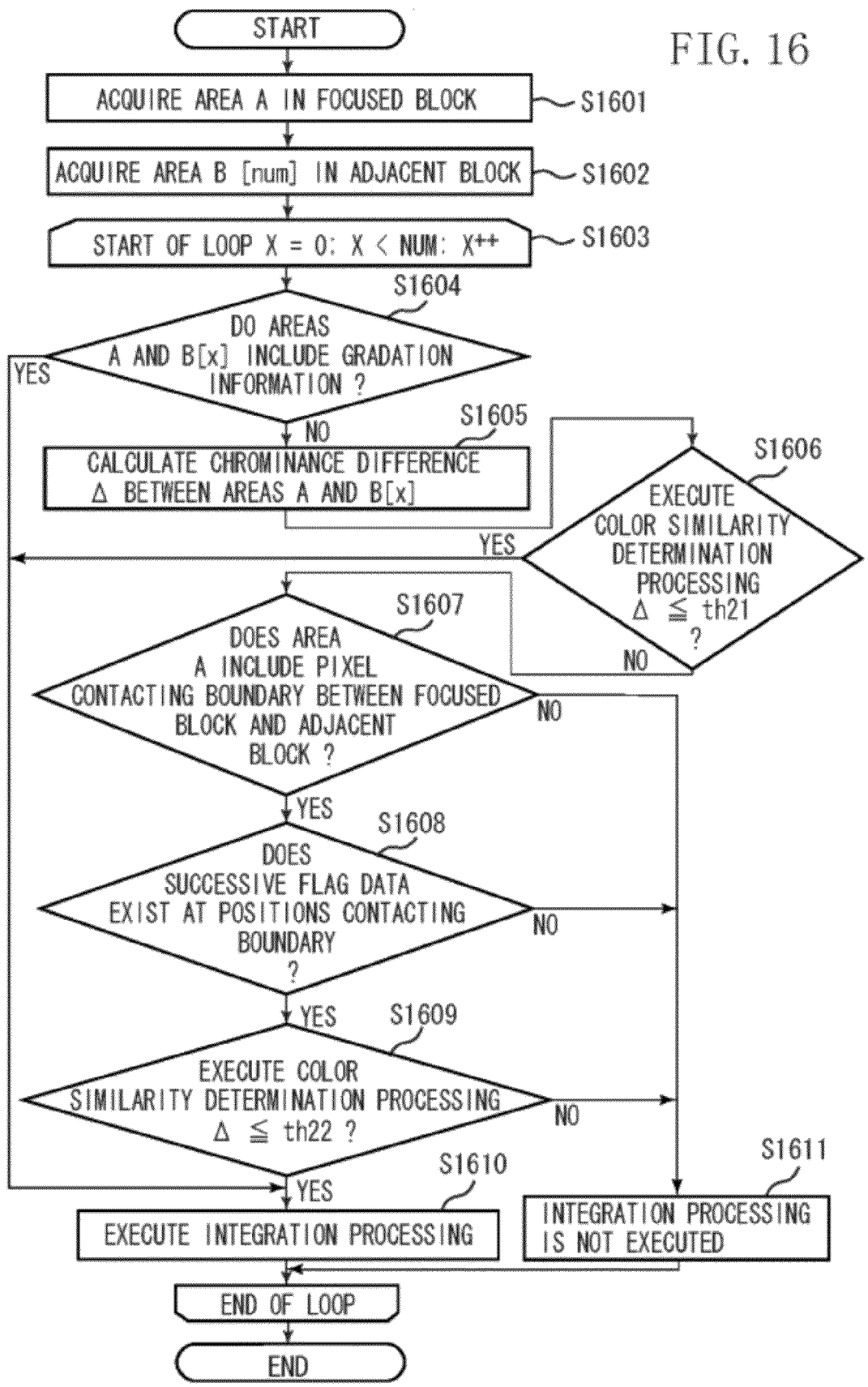
FIG. 16 is a flow chart illustrating an example of processing executed by the block integration unit 215 according to an exemplary embodiment of the present invention.
Figure 17:
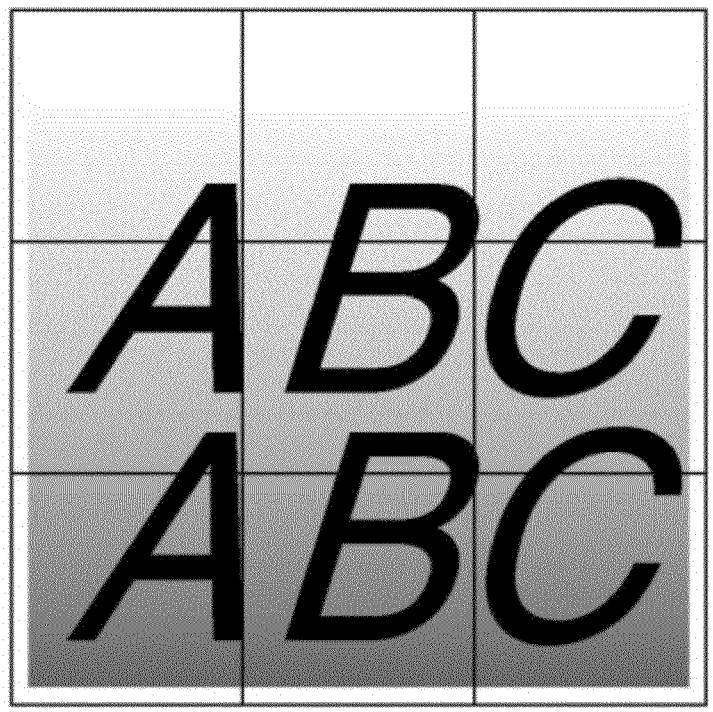
FIG. 17 illustrates an example of input image data according to an exemplary embodiment of the present invention.
Figure 18:
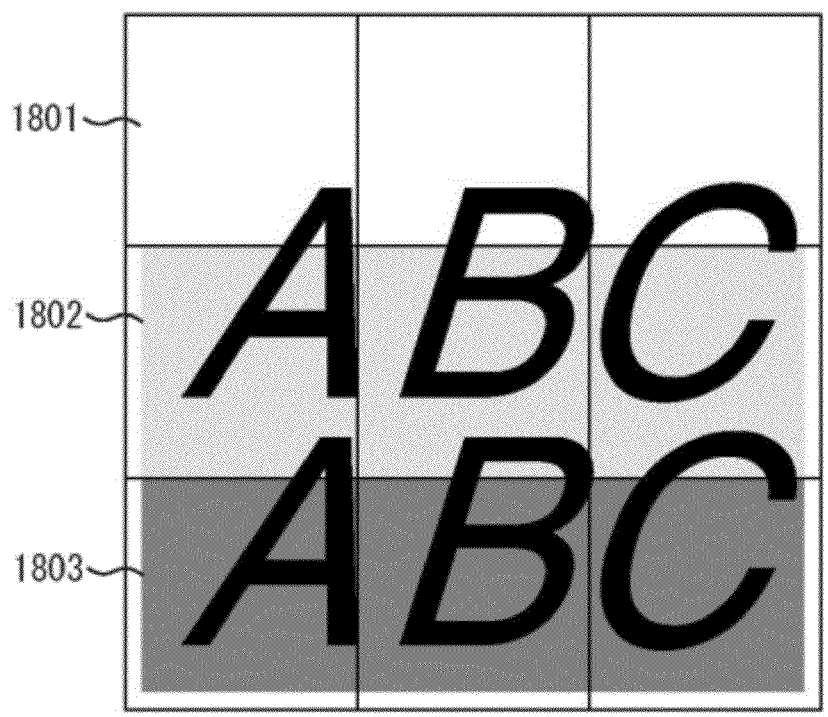
FIG. 18 illustrates an example of a result of color replacement processing executed on the image data illustrated in FIG. 17 according to an exemplary embodiment of the present invention.
Figure 19:
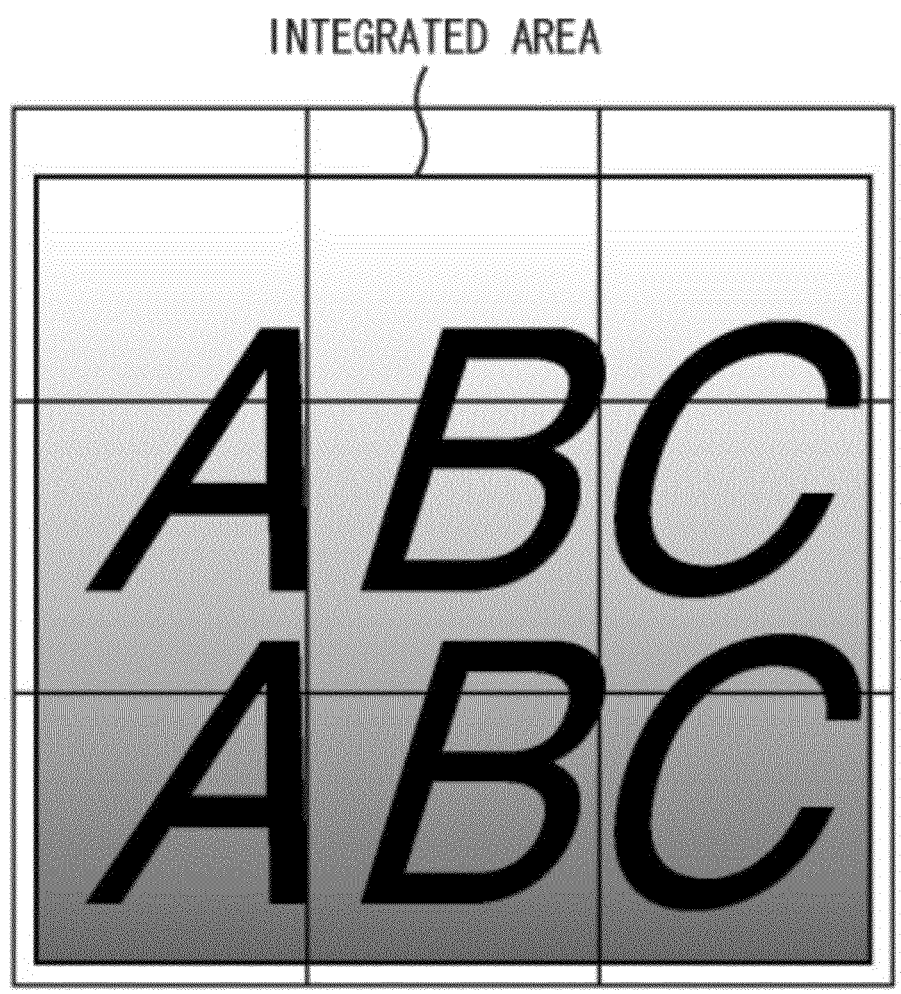
FIG. 19 illustrates an example of a result of integrated areas after color replacement processing illustrated in FIG. 18 according to an exemplary embodiment of the present invention.

The block integration unit 215 integrates the area that has been subjected to the color replacement block by block with a similar color-area of a block existing adjacent to the block. FIG. 16 is a flow chart illustrating exemplary processing executed by the block integration unit 215. FIG. 17 illustrates an example of input image data. FIG. 18 illustrates an example of a result of color replacement processing executed on the image data illustrated in FIG. 17. FIG. 19 illustrates an example of a result of the integration of the areas after the color replacement illustrated in FIG. 18.

Referring to FIG. 16, in step S1601, the block integration unit 215 acquires a focused area A that has been output from the gradation determination unit 214. In step S1602, the block integration unit 215 acquires an area B[num] that has been determined to be significant in another block existing adjacent to the focused block including the area A.

In the present exemplary embodiment, an "adjacent block" refers to a block that is in contact with the focused block (target block) on top or on the left thereof. More specifically, if the block to be processed is the block 505 (illustrated in FIG. 5B), the blocks 502 and 504 are adjacent blocks.

In step S1603, the block integration unit 215 issues a command for starting a loop of processing for executing processing in step S1604 and the subsequent steps on all the areas of the area B of the adjacent block acquired in step S1602.

In step S1604, the block integration unit 215 determines whether the areas A and B include gradation information. If it is determined that the areas A and B include gradation information (YES in step S1604), then the block integration unit 215 determines that continuous gradation exists in the areas A and B across a boundary. Accordingly, the processing advances to step S1610.

On the other hand, if it is determined that the areas A and B do not include gradation information (NO in step S1604), then, it is likely that the areas A and B do not include continuous gradation. Accordingly, in this case, the processing advances to step S1605 without executing integration.

Suppose that the color replacement unit 213 has executed the color replacement illustrated in FIG. 18 on the image having the gradation illustrated in FIG. 17 and that the gradation determination unit 214 has determined that areas 1801 and 1802 (see FIG. 18) and areas 1802 and 1803 (see FIG. 18) include gradation.

In this case, if the area 1801 is considered as an area A and the area 1802 is considered as an area B[x], then the block integration unit 215 integrates the area 1801 with the area 1802 in step S1610 because it has been determined in step S1604 that the areas 1801 and 1802 include gradation.

Similarly, if the area 1802 is considered as an area A and the area 1803 is considered as an area B [x], then the block integration unit 215 integrates the area 1802 with the area 1803 in step S1610 because it has been determined in step S1604 that the areas 1802 and 1803 include gradation. As a result, the areas 1801 through 1803 are to be integrated into one area as illustrated in FIG. 19.

In step S1605, the block integration unit 215 calculates the chrominance difference between the color information about the areas A and B. A publicly known method can be used in calculating the chrominance difference. In the present exemplary embodiment, the block integration unit 215 calculates a relative distance between the color information in a general color space.

In step S1606, the block integration unit 215 determines whether the chrominance difference calculated in step S1605 is equal to or less than a predetermined threshold value th21. More specifically, the block integration unit 215 determines whether the color information about the area A and the area B[xs] is similar to each other. If it is determined that the chrominance difference is equal to or less than the threshold value th21 (YES in step S1606), then the processing advances to step S1610. In step S1610, the block integration unit 215 executes integration processing. On the other hand, if it is determined that the chrominance difference is greater than the threshold value th21 (NO in step S1606), then, the processing advances to step S1607.

In step S1607, the block integration unit 215 determines whether the focused area includes a pixel that is in contact with the boundary between the focused block and an adjacent block. If it is determined that the focused area includes a pixel that is in contact with the boundary between the focused block and an adjacent block (YES in step S1607), then the processing advances to step S1608. On the other hand, if it is determined that the focused area does not include a pixel that is in contact with the boundary between the focused block and an adjacent block (NO in step S1607), then the processing advances to step S1611.

In step S1608, the block integration unit 215 refers to the flag data generated in the area B[x] by the pixel-attribute information generation unit 203 and determines whether successive flag data exists at a position that is in contact with the boundary.

If it is determined that successive flag data exists at a location in contact with the boundary (YES in step S1608), then the processing advances to step S1609. On the other hand, if it is determined that successive flag data does not exist at a position that is in contact with the boundary (NO in step S1608), then the processing advances to step S1611. In the processing in step S1608, it is determined whether "successive" flag data exists in addition to determining whether flag data exists. Thus, the present exemplary embodiment can prevent erroneously recognizing the area as noise.

At this stage of processing, the area B[x] is a part of an area. However, after the area B is divided into a plurality of small areas by block division processing, a result of color replacement may be affected by the color information dominantly existing within the block during the color replacement processing.

Therefore, in step S1609, the block integration unit 215 changes the threshold value Th21 to a different threshold value Th22 and uses the threshold value Th22 to determine whether the colors are similar to each other.

With respect to an area b, the threshold value Th22 is calculated by weighting the threshold value th21, which is used in step S1606, with a distance of the brightness of the color information about the area a, which has a largest area in the block, in a direction opposite to the area a. More specifically, in step S1609, the block integration unit 215 determines whether the color information about the areas A and B[x] is similar to each other.

If it is determined that the color information is similar to each other (YES in step S1609), then the processing advances to step S1610. In step S1610, the block integration unit 215 executes the integration processing. On the other hand, if it is determined that the color information is not similar to each other (NO in step S1609), then the processing advances to step S1611 and the block integration unit 215 does not execute the integration processing.

As described above, the present exemplary embodiment executes the processing in steps S1605 through S1609. However, the present invention is not limited to this. More specifically, if the processing for integrating the areas including gradation only is to be executed, the processing in steps S1605 through S1609 can be omitted. In this case, if it is determined in step S1604 that gradation information is included (YES in step S1604), then the processing directly advances to step S1611 and the block integration unit 215 does not execute integration.

The block integration unit 215 inputs the image data that has been subjected to the above-described integration processing, to an image analysis unit 220. The image analysis unit 220 includes an area division unit 221, a text conversion unit 223, a photograph conversion unit 225, a line art conversion unit 227, a table conversion unit 229, and a combination unit 2210, which is configured to combine results of the conversion by the above-described conversion units 223, 225, 227, and 229.

The area division unit 221 divides image data into a text area, a photograph area, a line art area, and a table area by using a publicly known method for dividing an area. More specifically, a method discussed in U.S. Pat. No. 5,680,478 can be used as the area division method.

U.S. Pat. No. 5,680,478 discusses a method for extracting black pixel groups and white pixel groups in a document image to extract a characteristic area, such as a text area, an (a line) art area, a graphic area, a table area, a frame area, or a line area based on the shape, the magnitude, and the state of the groups.

The present exemplary embodiment uses either of the method discussed in U.S. Pat. No. 5,680,478, a method for extracting a characteristic amount used in area division processing by extracting a similar color-pixel group from an input multivalued image, a method for extracting a characteristic amount used in area division processing based on a black pixel group acquired by binarizing a multivalued image, or a method for extracting a characteristic amount used in area division processing by extracting differentiation edge information generated based on a multivalued image as a pixel within an edge.

The area division unit 221 executes corresponding conversion to each area, such as a text area, a photograph area, a line art area, or a table area. More specifically, the text conversion unit 223 executes character recognition on each text area by using a publicly known character recognition method to generate character (text) code data.

Now, an example of the character recognition method will be described in detail below. At first, determination in the direction of lines of the text area is executed (i.e., the orientation of writing on the document is determined). The orientation of writing on a document can be determined according to vertical and horizontal projection values acquired from a binarized image. In this case, an orientation having a relatively low distribution of projection can be determined as the line writing direction.

Then, the image is divided into text image areas. The image can be divided into text images in the following manner. At first, the image is divided into line images according to a space between lines, along which the image is to be divided, based on a projection of a binary image in the line writing direction. Then each line image is divided into text images (character images) according to a space between characters, along which the line image is to be divided, by using a projection in a direction perpendicular to the line.

In addition, a characteristic of each text image is acquired. Then, a characteristic, among characteristics stored in a dictionary file storing characteristics of all character types, which is most similar to the characteristic of the text image, is extracted. Then, the character code described in the dictionary file is used as a result of recognition of each character. Furthermore, the photograph conversion unit 225 generates a high image quality-raster data by using publicly known high resolution conversion processing.

The line art conversion unit 227 generates vector drawing data of a line art based on image data of a line art by using a publicly known vectorization method. A method discussed in U.S. Pat. No. 6,404,921 or U.S. Patent Application Publication No. 2005/0238244 can be used as the vectorization method.

The method discussed in U.S. Pat. No. 6,404,921 extracts inter-pixel vectors in the horizontal and vertical directions according to a state of a focused pixel and pixels adjacent thereto while rasterization-scanning the image. Then, the method discussed in U.S. Pat. No. 6,404,921 extracts an outline of the image data according to the connection state among the inter-pixel vectors to generate an outline vector, which is information describing the surrounding of connected pixel data as a group of inter-pixel vectors.

U.S. Patent Application Publication No. 2005/0238244 discusses a method for generating vector description data having a high image quality, when greatly magnified, by approximating an outline vector by using a straight line or a two- or three-dimensional Bézier curve.

The table conversion unit 229 generates vector drawing data by a publicly known vectorization method by executing processing on ruled lines. In addition, the table conversion unit 229 generates character (text) code data by executing the above-described publicly known character recognition method on text areas.

In the present exemplary embodiment, the text conversion unit 223, the photograph conversion unit 225, the line art conversion unit 227, and the table conversion unit 229 execute the above-described processing. However, the present exemplary embodiment is not limited to this. More specifically, for example, the text conversion unit 223 can execute vector conversion or high image-quality raster data conversion. Furthermore, the table conversion unit 229 can generate high image-quality raster data.

Figure 20:
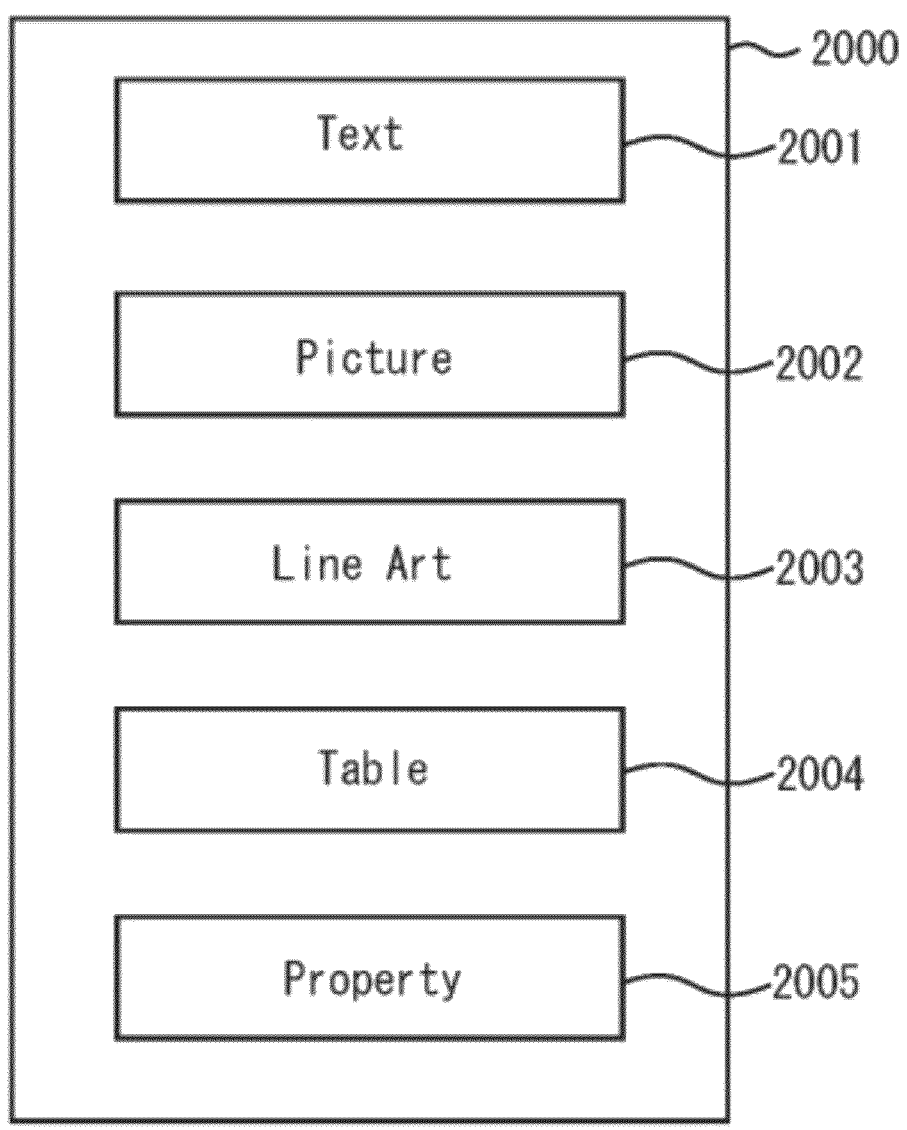
FIG. 20 illustrates an example of data combined by the combination unit 2210 according to an exemplary embodiment of the present invention.

The combination unit 2210 combines data generated by each conversion unit into one piece of data. FIG. 20 illustrates an example of the data combined by the combination unit 2210 according to the present exemplary embodiment.

Referring to FIG. 20, the entire data 2000, which is generated by the combination unit 2210, includes the following portions. A "text" portion 2001 stores a result of conversion of the area determined by the area division unit 221 to be a text area and positional information of the text area within the image. A "picture" portion 2002 stores a result of conversion of the area determined by the area division unit 221 to be a photograph area and positional information of the photograph area within the image.

Furthermore, a "line art" portion 2003 stores a result of conversion of the area determined by the area division unit 221 to be a line art area and positional information of the line art area within the image. A "table" portion 2004 stores a result of conversion of the area determined by the area division unit 221 to be a table area and positional information of the table area within the image. A "property" portion 2005 stores bibliographic information, such as the number of pages, a page size, input device information, time stamp information of the input data.

The electronic file conversion unit 204 converts combined data into an electronic file. More specifically, in the present exemplary embodiment, the electronic file conversion unit 204 converts combined data into an electronic file that can be reproduced and edited on the PC 120.

With the above-described configuration, each exemplary embodiment of the present invention can effectively prevent deterioration of image quality that may occur due to wrong division of image by dividing areas of image data including gradation with a high accuracy.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-217322 filed Aug. 26, 2008, which is hereby incorporated by reference herein in its entirety.

What is claimed is:

1. An image processing apparatus comprising:
an input unit configured to input image data;
an attribute information generation unit configured to generate attribute information about each pixel of the image data input by the input unit;
a division unit configured to divide the image data input by the input unit into a plurality of blocks of a predetermined size;
a generation unit configured to generate a histogram of colors and the number of pixels of each color existing in a focused block divided by the division unit;
a color replacement unit configured to execute color replacement processing on each area defined by the histogram generated by the generation unit;
a calculation unit configured to calculate, according to a result of the color replacement processing by the color replacement unit, a chrominance difference between a focused pixel contacting a boundary between the focused block and an adjacent block, which exists at a location adjacent to the focused block within a focused area of the focused block, and an adjacent pixel contacting the boundary within an adjacent area of the adjacent block located adjacent to the focused area, the adjacent pixel being located adjacent to the focused pixel;
a first determination unit configured to determine whether the chrominance difference calculated by the calculation unit falls within a predetermined range;
a second determination unit configured to determine whether a ratio Y/X is equal to or less than a predetermined threshold value, where "X" denotes a number of combinations of the focused pixel and the adjacent pixel whose chrominance difference is determined by the first determination unit to fall within the predetermined range and "Y" denotes a number of combinations of the focused pixel and the adjacent pixel, to at least either one of which the attribute information is added; and
an integration unit configured, if it is determined by the second determination unit that the ratio Y/X is equal to or less than the threshold value, to integrate the focused area and the adjacent area to generate continuous gradation in the focused area and the adjacent area based on a determination that gradation across the boundary exists.

2. The image processing apparatus according to claim 1, wherein the attribute information generation unit is configured to generate the attribute information for identifying whether the focused pixel is located at an edge of the focused area.

3. An image processing method comprising:
inputting image data;
generating attribute information about each pixel of the input image data;
dividing the input image data into a plurality of blocks of a predetermined size;
generating a histogram of colors and the number of pixels of each color existing in a divided focused block;
executing color replacement processing on each area defined by the generated histogram;
calculating, according to a result of the color replacement processing, a chrominance difference between a focused pixel contacting a boundary between the focused block and an adjacent block, which exists at a location adjacent to the focused block within a focused area of the focused block, and an adjacent pixel contacting the boundary within an adjacent area of the adjacent block located adjacent to the focused area, the adjacent pixel being located adjacent to the focused pixel;
determining whether the calculated chrominance difference falls within a predetermined range;
determining whether a ratio Y/X is equal to or less than a predetermined threshold value, where "X" denotes a number of combinations of the focused pixel and the adjacent pixel whose chrominance difference is determined to fall within the predetermined range and "Y" denotes a number of combinations of the focused pixel and the adjacent pixel, to at least either one of which the attribute information is added; and
integrating, if it is determined that the ratio Y/X is equal to or less than the threshold value, the focused area and the adjacent area to generate continuous gradation in the focused area and the adjacent area based on a determination that gradation across the boundary exists.

4. A computer-readable storage medium storing instructions which, when executed by a computer, cause the computer to perform operations comprising:
generating attribute information about each pixel of input image data;
dividing the input image data into a plurality of blocks of a predetermined size;
generating a histogram of colors and the number of pixels of each color existing in a divided focused block;
executing color replacement processing on each area defined by the generated histogram;
calculating, according to a result of the color replacement processing, a chrominance difference between a focused pixel contacting a boundary between the focused block and an adjacent block, which exists at a location adjacent to the focused block within a focused area of the focused block, and an adjacent pixel contacting the boundary within an adjacent area of the adjacent block located adjacent to the focused area, the adjacent pixel being located adjacent to the focused pixel;
determining whether the calculated chrominance difference falls within a predetermined range;
determining whether a ratio Y/X is equal to or less than a predetermined threshold value, where "X" denotes a number of combinations of the focused pixel and the adjacent pixel whose chrominance difference is determined to fall within the predetermined range and "Y" denotes a number of combinations of the focused pixel and the adjacent pixel, to at least either one of which the attribute information is added; and
integrating, if it is determined that the ratio Y/X is equal to or less than the threshold value, the focused area and the adjacent area to generate continuous gradation in the focused area and the adjacent area based on a determination that gradation across the boundary exists.

* * * * *